United States Patent
Sheu

(10) Patent No.: US 6,876,517 B2
(45) Date of Patent: Apr. 5, 2005

(54) DATA STORAGE DEVICE WITH SPINDLE MOTOR

(75) Inventor: Ming-Goei Sheu, Cupertino, CA (US)

(73) Assignee: ESGW Holdings Limited, Tortola (VG)

( * ) Notice: Subject to any disclaimer, the term of this patent is extended or adjusted under 35 U.S.C. 154(b) by 89 days.

(21) Appl. No.: 10/385,799

(22) Filed: Mar. 10, 2003

(65) Prior Publication Data

US 2004/0205801 A1 Oct. 14, 2004

(51) Int. Cl.[7] .............................................. G11B 17/02
(52) U.S. Cl. ................................................... 360/99.12
(58) Field of Search ........................... 360/99.12, 99.08, 360/99.06; 369/264, 270, 21

(56) References Cited

U.S. PATENT DOCUMENTS

| | | | | |
|---|---|---|---|---|
| 5,493,462 A | * | 2/1996 | Peter ......................... 360/99.12 |
| 5,517,376 A | * | 5/1996 | Green ......................... 360/98.08 |
| 5,828,519 A | * | 10/1998 | Sasa ........................... 360/99.12 |
| 6,016,238 A | * | 1/2000 | Yoshikawa et al. ......... 360/99.08 |
| 6,417,988 B1 | * | 7/2002 | Renken et al. .............. 360/99.12 |
| 6,556,376 B1 | * | 4/2003 | Boutaghou .................. 360/99.12 |
| 6,567,238 B1 | * | 5/2003 | Renken et al. .............. 360/99.12 |

* cited by examiner

*Primary Examiner*—Allen Cao
(74) *Attorney, Agent, or Firm*—George O. Saile; Stephen B. Ackerman

(57) ABSTRACT

A data storage device (10) includes a stator (20), a rotor (40), a disk (80), and a clamp (60) attaching the disk to the rotor. The rotor includes a hub (48) forming a shoulder (57) at a top portion thereof. A recess (56) is defined in the top portion of the hub and surrounded by the shoulder. An outer diameter of the recess is equal to or larger than a diameter of a central opening (82) of the disk. The disk is seated on the shoulder of the hub. The clamp includes a bottom fixing part (62) fixedly attached to the hub in the recess, a cylindrical wall (64) abutting an inside of the shoulder and the disk in the central opening, and a pressing part (66) extending through the central opening of the disk and pressing on the disk thereby ensuring that the disk can rotate with the rotor.

16 Claims, 4 Drawing Sheets

DATA STORAGE DEVICE WITH SPINDLE MOTOR

BACKGROUND OF THE INVENTION

1. Field of the Invention

The present invention relates to electronic data storage devices, and more particularly to a data storage device incorporating a spindle motor on which disks can be readily and conveniently attached.

2. Description of Prior Art

Various data storage devices are installed in electronic apparatus for communication and handling of data. Such devices include, for example, hard disk drives, floppy disk drives and CD-ROM (Compact Disk-Read Only Memory) drives.

Referring to FIG. 4 a conventional data storage device comprises a stator 120, a rotor 140, a plurality of spaced, parallel disks 160 and a clamp 180. The stator 120 comprises a plurality of radial stator laminations 124. A winding 122 is wound around each stator lamination 124. The rotor 140 comprises a shaft 142 rotatably attached to the stator 120 by a pair of bearings 144, and a hub 146 fixed around the shaft 42. A magnet 148 is attached to a bottom portion of the hub 146 and surrounds free ends or the stator laminations 124. The disks 160 are attached around the hub 146, with the hub 146 extending through central openings of the disks 160. The clamp 180 is fixed to the shaft 142 by a screw 190. The clamp 180 comprises a pressing part 182 resiliently abutting a topmost disk 160. When the windings 122 are electrified., the magnet 148 drives the combined rotor 140, disks 160 and clamp 180 to rotate about the shaft 142.

However, a conventional tool cannot be used when the disks 160 are attached to the rotor 140. This is because the tool detachably engages in the central openings of the disks 160, which would cause the hub 146 to interfere with the tool. Therefore, a suction device must be used. The suction device detachably engages with the disks 160 around the central openings thereof. However, a suction device is costly to acquire, use and maintain.

SUMMARY OF THE INVENTION

Accordingly, an object of the present invention is to provide a data storage device incorporating a spindle motor on which disks can be readily and conveniently attached with a conventional tool.

To achieve the above object, a data storage device in accordance with a preferred embodiment of the present invention comprises a stator, a rotor, a disk, and a clamp attaching the disk to the rotor. The rotor comprises a hub, the hub forming a shoulder at a top portion thereof. A recess is defined in the top portion of the hub, the recess being surrounded by the shoulder. An outer diameter of the recess is equal to or larger than a diameter of a central opening of the disk. The disk is seated on the shoulder of the hub. The clamp comprises a bottom fixing part fixedly attached to the hub in the recess, a cylindrical wall abutting an inside of the shoulder and the disk in the central opening, and a pressing part extending through the central opening of the disk and pressing on the disk thereby ensuring that the disk can rotate with the rotor.

In an alternative embodiment, the hub further comprises a protruding portion extending upwardly from a central portion thereof and surrounded by the recess. The rotor comprises a shaft fixed to the protruding portion, so that the hub rotates with the shaft.

Other objects, advantages and novel features of the present invention will be drawn from the following detailed description of the preferred embodiments of the present invention with the attached drawings, in which:

DESCRIPTION OF THE PREFERRED EMBODIMENTS

Figure 1:
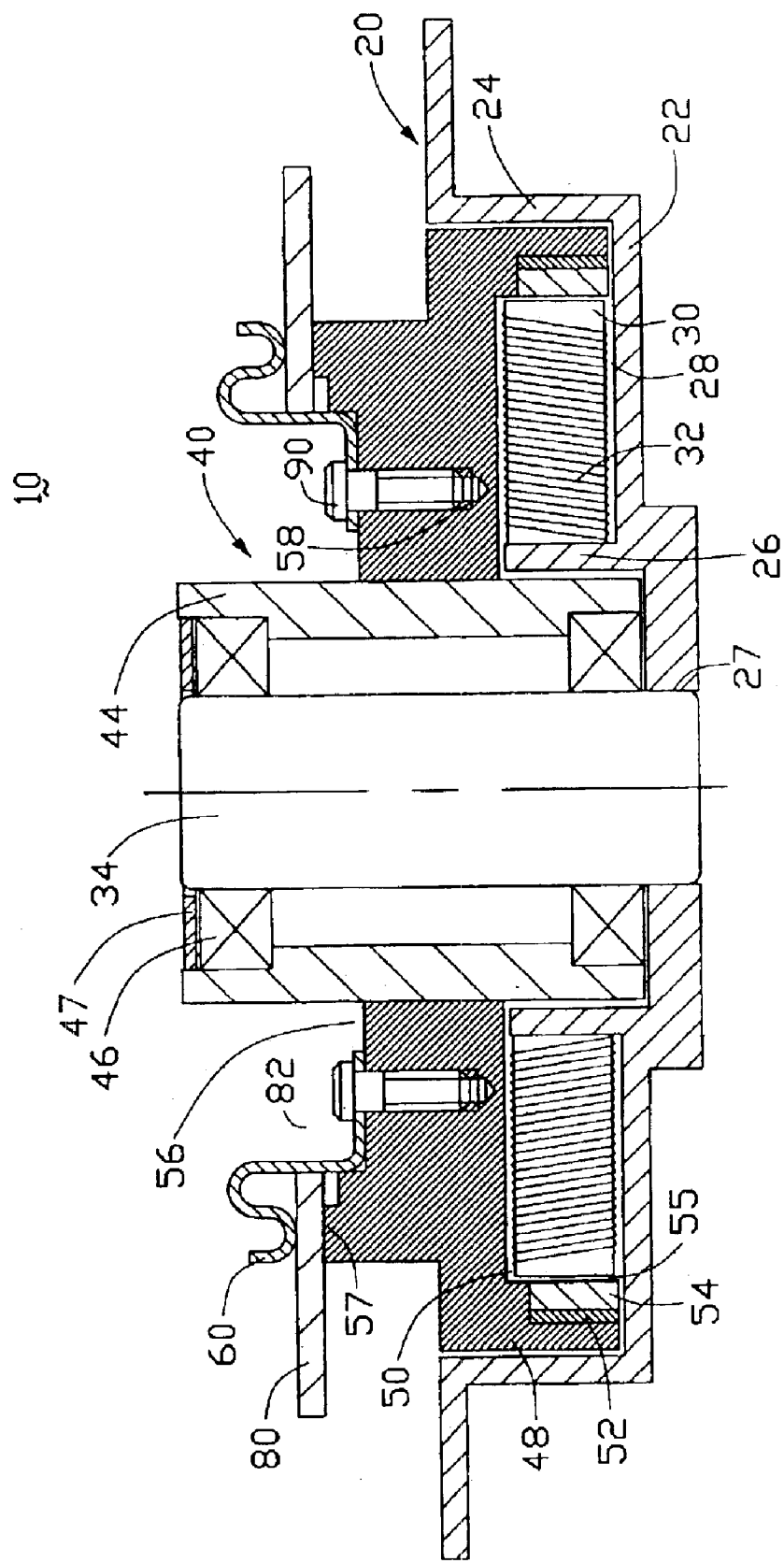
FIG. 1 is a schematic, cross-sectional view of a data storage device in accordance with the preferred embodiment of the present invention.

Referring to FIG. 1, a data storage device 10 in accordance with the preferred embodiment of the present invention comprises a stator 20, a rotor 40, a clamp 60 and at least one disk 80. For the sake of simple description and illustration of the first preferred embodiment, the at least one disk 80 is hereinafter described as being a single disk 80 only.

The stator 20 comprises a baseplate 22, an outer cylinder 24 extending upwardly from a circumferential edge of the baseplate 22, and an inner cylinder 26 extending upwardly from a central portion of the baseplate 22. A hole 27 is defined in a center of the baseplate 22. A space 28 is defined between the outer cylinder 24 and the inner cylinder 26. A plurality of spaced stator laminations 30 extends radially from the inner cylinder 26 into the space 28. A free end of each stator lamination 30 is spaced from the outer cylinder 26. A winding 32 is wound around each stator lamination 30. A shaft 34 is interferentially fixed in the hole 27 of the baseplate 22.

The rotor 40 comprises a tube 44, a hub 48, and a magnet 54. The tube 44 surrounds the shaft 34 of the stator 20, with a pair of bearings 46 rotatably connecting the tube 44 to the shaft 34. An annular seal 47 is attached on a top portion of the tube 44 covering an upper one of the bearings 46, so that loose particles and other contaminants emanating from the bearings 46 cannot reach the disk 80. The hub 48 is interferentially engaged around a middle portion of the tube 44. A cavity 50 is defined in a bottom portion of the hub 48, for receiving the stator laminations 30 and the magnet 54 therein. A shield member 52 is attached to a bottom portion of the hub 48. The magnet 54 is in the form of an annular ring, and fixed to the shield member 52 in the cavity 50. The magnet 54 is separated from the free ends of the stator laminations 30 by a cylindrical air gap 55. A recess 56 is defined in a top portion of the hub 48. A diameter of the recess 56 is equal to or larger than a diameter of a central opening 82 of the disk 80. An annular shoulder 57 is therefore formed at a periphery of the top portion of the hub 48, for supporting the disk 80 thereon. A plurality of evenly spaced screw holes 58 is defined in the hub 48, below and in communication with the recess 56. A plurality of screws 90 is for attaching the clamp 60 to the hub 48.

Figure 2:
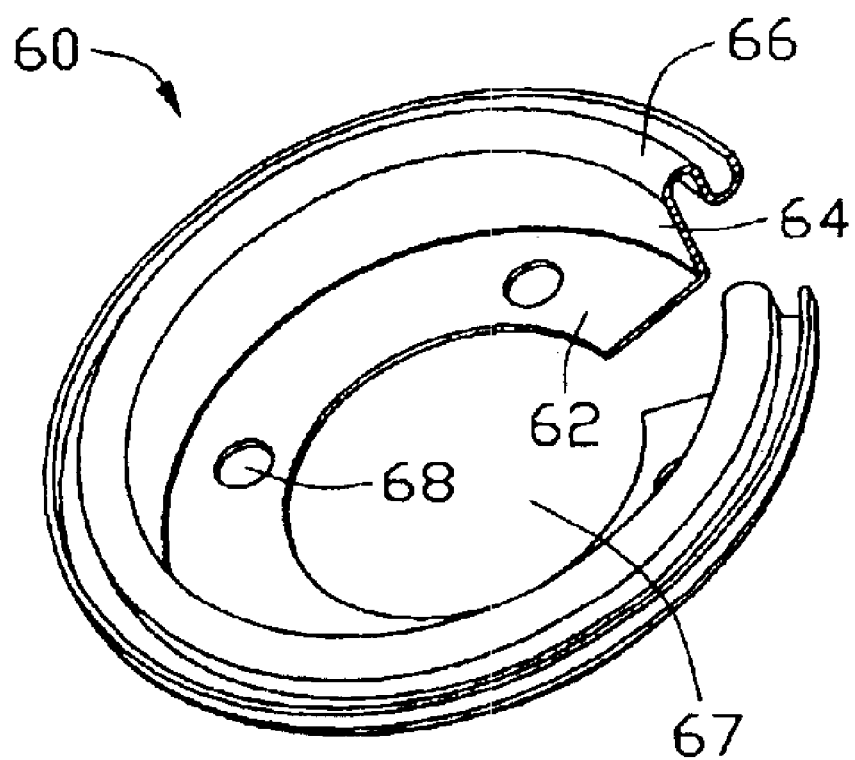
FIG. 2 is an isometric view of a clamp of the data storage device of FIG. 1, with part of the clamp cut away for better illustration.

Referring also to FIG. 2, the clamp 60 is generally annular, and comprises a bottom fixing part 62, a cylindrical wall 64 and a top pressing part 66. An opening 67 is defined in a middle of the fixing part 62. A plurality of evenly spaced through holes 68 is defined in the fixing part 62 around the opening 67, corresponding to the screw holes 58 of the hub 48. The cylindrical wall 64 extends perpendicularly upwardly from a periphery of the fixing part 62. An outer diameter of the cylindrical wall 64 is substantially equal to the diameter of the recess 56 of the hub 48. The pressing part 66 extends generally perpendicularly outwardly from a top end of the cylindrical wall 64, and has a generally S-shaped cross-section.

In assembly, the disk 80 is placed on the shoulder 57 by a conventional tool (not shown) that detachably engages in the opening 82 of the disk 80. Then the clamp 60 is extended through the opening 82 of the disk 80 and placed in the recess 56 of the hub 48. The cylindrical wall 64 of the clamp 60 abuts an inner circumferential surface of the shoulder 57 and an inner circumferential edge of the disk 80, thereby positioning the disk 80 on the hub 48. The screws 90 are extended through the through holes 68 of the clamp 60, and engaged in the corresponding screw holes 58 of the hub 48. The pressing part 66 of the clamp 60 resiliently abuts an inner portion of the disk 80. The disk 80 is thus firmly and securely attached to the hub 48. When the windings 32 are electrified, the magnet 54 drives the combined rotor 40, disk 80 and clamp 60 to rotate about the shaft 34.

Figure 3:
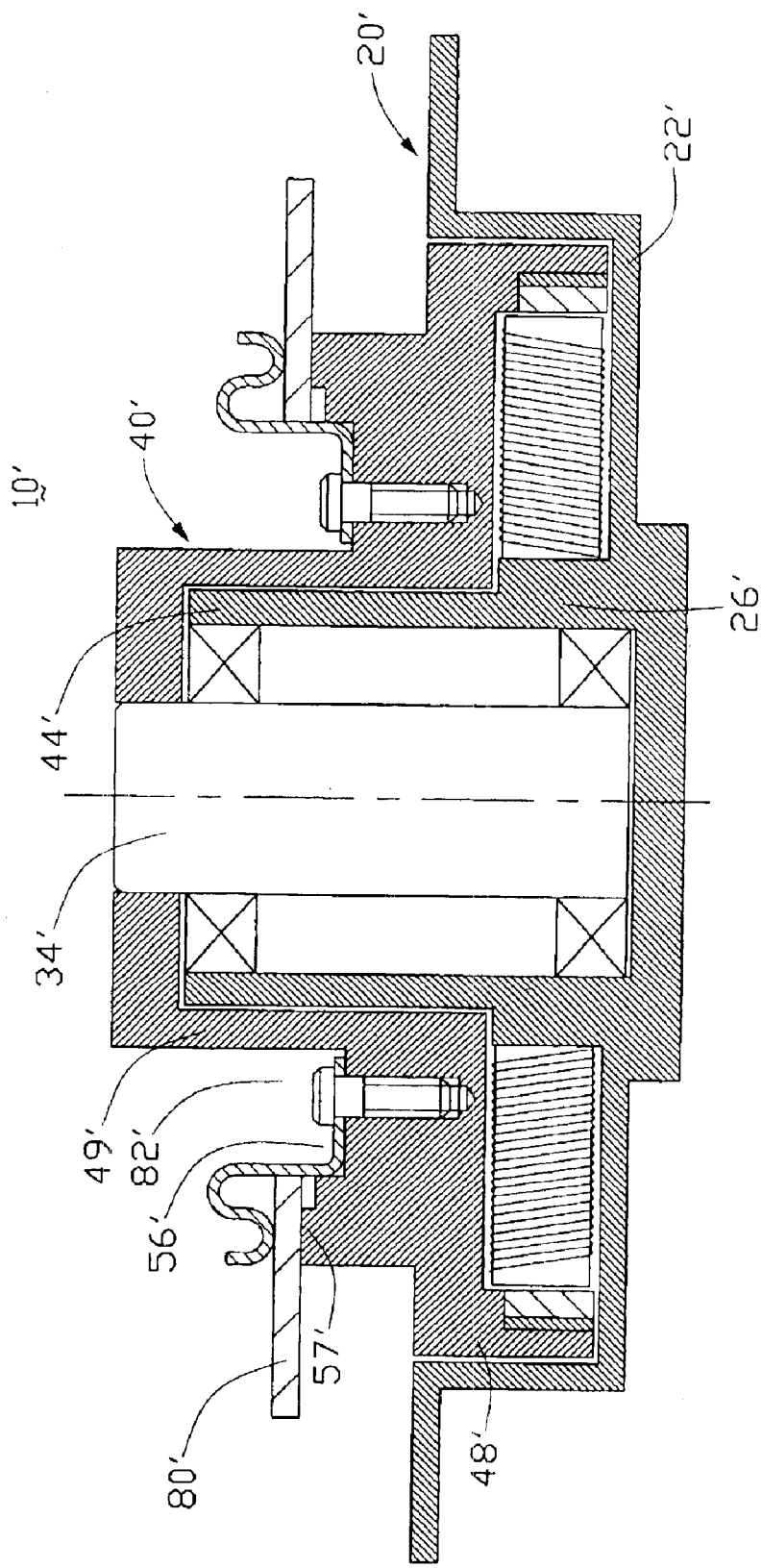
FIG. 3 is a schematic, cross-sectional view of a data storage device in accordance with an alternative embodiment of the present invention.
Figure 4:
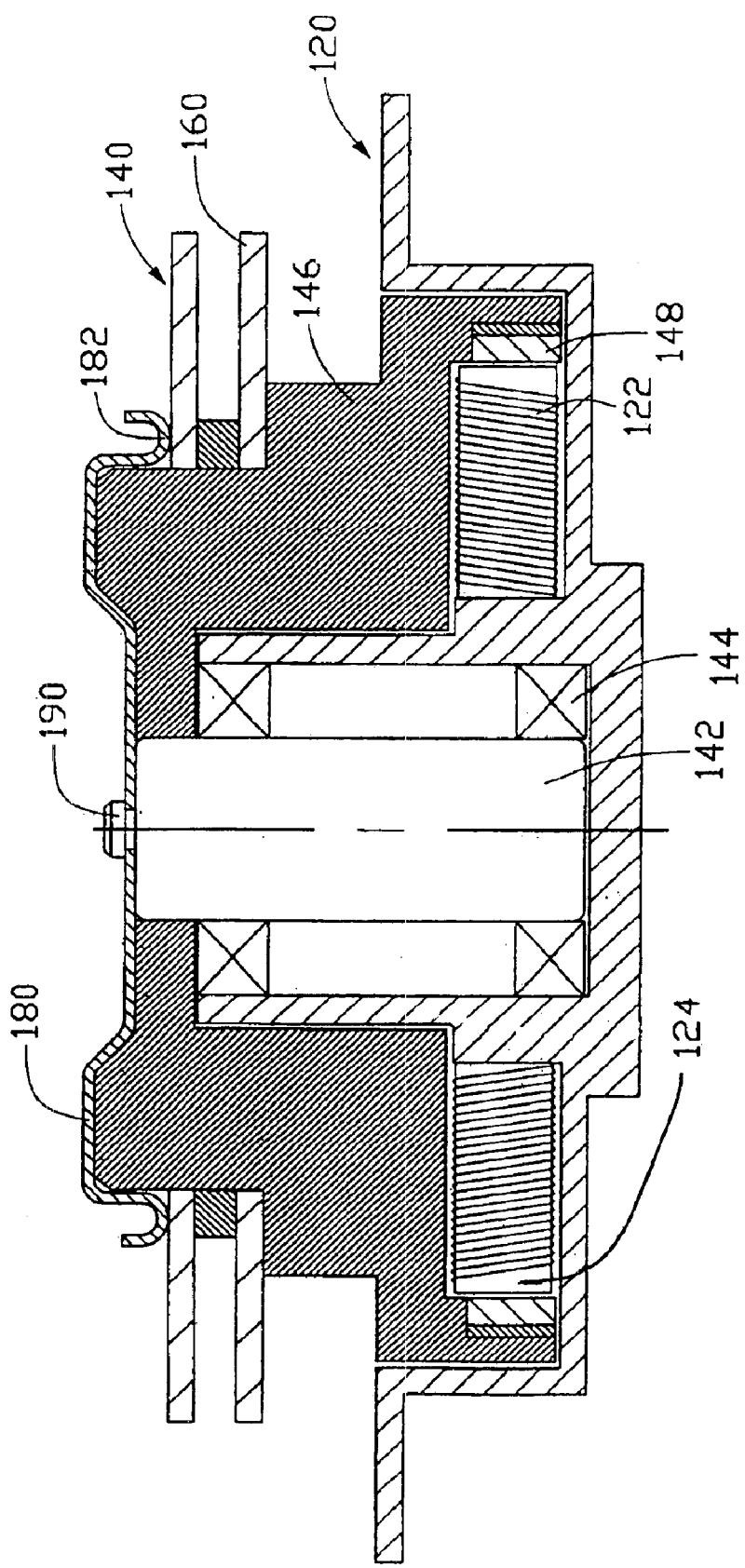
FIG. 4 is a schematic, cross-sectional view of a conventional data storage device.

FIG. 3 shows a data storage device 10' in accordance with an alternative embodiment of the present invention. The data storage device 10' is similar to the date storage device 10 of the preferred embodiment, except for the following. In the alternative embodiment, a tube 44' is integrally formed with an inner cylinder 26' of a baseplate 22' of a stator 20'. A hub 48' of a rotor 40' has a protruding portion 49' extending upwardly from a central portion thereof, the protruding portion 49' being surrounded by a recess 56'. The protruding portion 49' extends through a disk 80' having a central opening 82'. A shaft 34' is fixed to the protruding portion 49', so that the protruding portion 49' rotates with the shaft 34'. Assembly and operation of the data storage device 10' are similar to those of the data storage device 10 of the preferred embodiment.

In the present invention, the disk 80, 80' is supported on the shoulder 57, 57' of the hub 48, 48', and the hub 48, 48' defines a recess 56, 56' below and in communication with the central opening 82, 82' of the disk 80, 80'. The conventional tool (not shown) can thus be conveniently used to hold the disk 80, 80' when the disk 80, 80' is attached to the hub 48, 48', or when the disk 80, 80' is detached from the hub 48, 48'.

While the present invention has been illustrated by the description of preferred embodiments thereof, and while the preferred embodiments have been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A data storage device comprising:
   a stator;
   a rotor rotatable about the stator, the rotor comprising a hub, the hub defining a recess in a top thereof and having a shoulder surrounding the recess and a plurality of threaded holes in said recess;
   at least one disk seated on the shoulder, the at least one disk defining a central opening above and in communication with the recess; and
   a clamp comprising a bottom fixing part, defining a plurality of through holes patterned to correspond to said threaded holes, a cylindrical wall extending from a circumferential edge of the fixing part, and a pressing part extending outwardly from the cylindrical wall and abutting the at least one disk, and fixed to the hub in the recess by means of a plurality of fasteners extending through the through holes and engaging with the hub in the threaded holes, respectively, and pressing on the at least one disk thereby mounting the at least one disk to the rotor.

2. The data storage device as claimed in claim 1, wherein an outer diameter of the recess is equal to or larger than a diameter of the central opening of the at least one disk.

3. The data storage device as claimed in claim 1, wherein the cylindrical wall of the clamp abuts an inside of the shoulder in the recess.

4. The data storage device as claimed in claim 1, wherein the cylindrical wall of the clamp extends through the, central opening of the least one disk and abuts the at least one disk in the central opening.

5. The data storage device as claimed in claim 2, wherein the stator comprises a shaft, the rotor comprises a tube rotatably attached around the shaft by bearings, and the hub is fixedly attached around the tube.

6. The data storage device as claimed in claim 5, wherein the stator further comprises a baseplate, an outer cylinder, an inner cylinder and a plurality of stator laminations arranged between the outer and inner cylinders, and wherein the shaft is fixed to the baseplate in the inner cylinder.

7. The data storage device as claimed in claim 2, wherein the hub further comprises a protruding portion surrounded by the recess and extending through the central opening of the at least one disk, and the rotor further comprises a shaft fixed to the protruding portion so that the hub can rotate with the shaft.

8. A data storage device comprising:
   a stator having a first central cylindrical member housing bearings;
   a rotor rotatable about the stator, the rotor comprising a hub wherein the hub defines a recess below the at least one disk and in communication with the central opening and further wherein the hub has a second cylindrical member fitted around, and concentric but not in contact with said first cylindrical member and attached by a bridging member to a central shaft within said first cylindrical member passing through and in contact with the inner races of said bearings;
   at least one disk mounted to the hub, the at least one disk defining a central opening; and
   a clamp comprising a bottom fixing part, defining a plurality of through holes patterned to correspond to said threaded holes, a cylindrical wall extending from a circumferential edge of the fixing part, and a pressing part extending outwardly from the cylindrical wall and abutting the at least one disk, and attached on the hub by means of a plurality of fasteners extending through the through holes and engaging with the hub in the threaded holes, respectively, the clamp further comprising a pressing part pressing on the at least one disk such that the at least one disk is capable of rotating with the rotor.

9. The data storage device as claimed in claim 8, wherein the stator comprises a plurality of stator laminations each having a winding wound therearound.

10. The data storage device as claimed in claim 9, wherein the hub defines a cavity in a bottom portion thereof, the cavity receiving the stator laminations therein.

11. The data storage device as claimed in claim 8, wherein the hub comprises a shoulder at a top portion thereof, the shoulder surrounding the recess.

12. The data storage device as claimed in claim 11, wherein the cylindrical wall abuts an inside of the shoulder.

13. The data storage device as claimed in claim 8, wherein the hub further comprises a protruding portion extending through the central opening of the at least one disk and surrounded by the recess, and wherein the rotor further comprises a shaft fixed to the protruding portion so that the hub can rotate with the shaft.

14. The data storage device as claimed in claim 8, wherein the pressing part has a S-shaped cross-section.

15. The data storage device as claimed in claim 8, wherein said clamp includes a cylindrical wall compliantly received in the central opening to restrict lateral movement of said disk relative to the hub.

16. A method of assembly a disk drive motor, comprising steps of: providing a stator; providing a rotor rotatably surrounding said stator, said stator including a hub, said hub defining a recess in a top thereof and having a shoulder surrounding the recess and a plurality of threaded holes in said recess; providing a clamp comprising a bottom fixing part, defining a plurality of through holes patterned to correspond to said threaded holes, a cylindrical wall extending from a circumferential edge of the fixing part, and a pressing part extending outwardly from the cylindrical wall; downwardly locating a memory disk, via a non-vacuum procedure, to a top face of the hub, said disk defining a central opening concentric to the hub and in communication with the recess; and downwardly locating said clamp to the hub; and fastening with screws inserted through said through holes and into said threaded holes, thereby, downwardly pressing the disk against the top face of the hub with said pressing part.

* * * * *